(12) United States Patent
Steeby

(10) Patent No.: US 6,309,323 B1
(45) Date of Patent: *Oct. 30, 2001

(54) ENGINE OUTPUT TORQUE CONTROL FOR POWERTRAIN WITH ENGAGEABLE POSITIVE CLUTCHES

(75) Inventor: Jon A. Steeby, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,119

(22) Filed: May 12, 2000

Related U.S. Application Data

(63) Continuation of application No. 09/330,570, filed on Jun. 11, 1999, now Pat. No. 6,080,082.

(51) Int. Cl.⁷ .................................................. B60K 41/08
(52) U.S. Cl. .......................................... 477/111; 477/107
(58) Field of Search .................................... 477/107, 111, 477/109, 181, 180, 90; 74/335

(56) References Cited

U.S. PATENT DOCUMENTS

| | | | |
|---|---|---|---|
| 4,889,014 | 12/1989 | Iwata | 477/101 |
| 5,058,013 | * 10/1991 | Iwatsuki et al. | 477/109 X |
| 5,385,517 | * 1/1995 | Hara et al. | 477/109 X |
| 5,457,633 | 10/1995 | Palmer et al. | 364/431.09 |
| 5,477,827 | 12/1995 | Weisman et al. | 123/436 |
| 5,679,096 | 10/1997 | Stine et al. | 477/111 |
| 5,738,606 | 4/1998 | Bellinger | 477/111 |
| 5,797,110 | 8/1998 | Braun et al. | 701/84 |
| 5,878,624 | * 3/1999 | Showalter et al. | 74/335 X |

* cited by examiner

*Primary Examiner*—Charles A. Marmor
*Assistant Examiner*—Ankur Parekh
(74) *Attorney, Agent, or Firm*—Howard D. Gordon

(57) ABSTRACT

A powertrain system (10) control system/method for controlling engine (12) output torque as a function of sensed degree of engagement of jaw clutch members (62, 64) associated with the engaged ratio of a transmission (14).

33 Claims, 4 Drawing Sheets

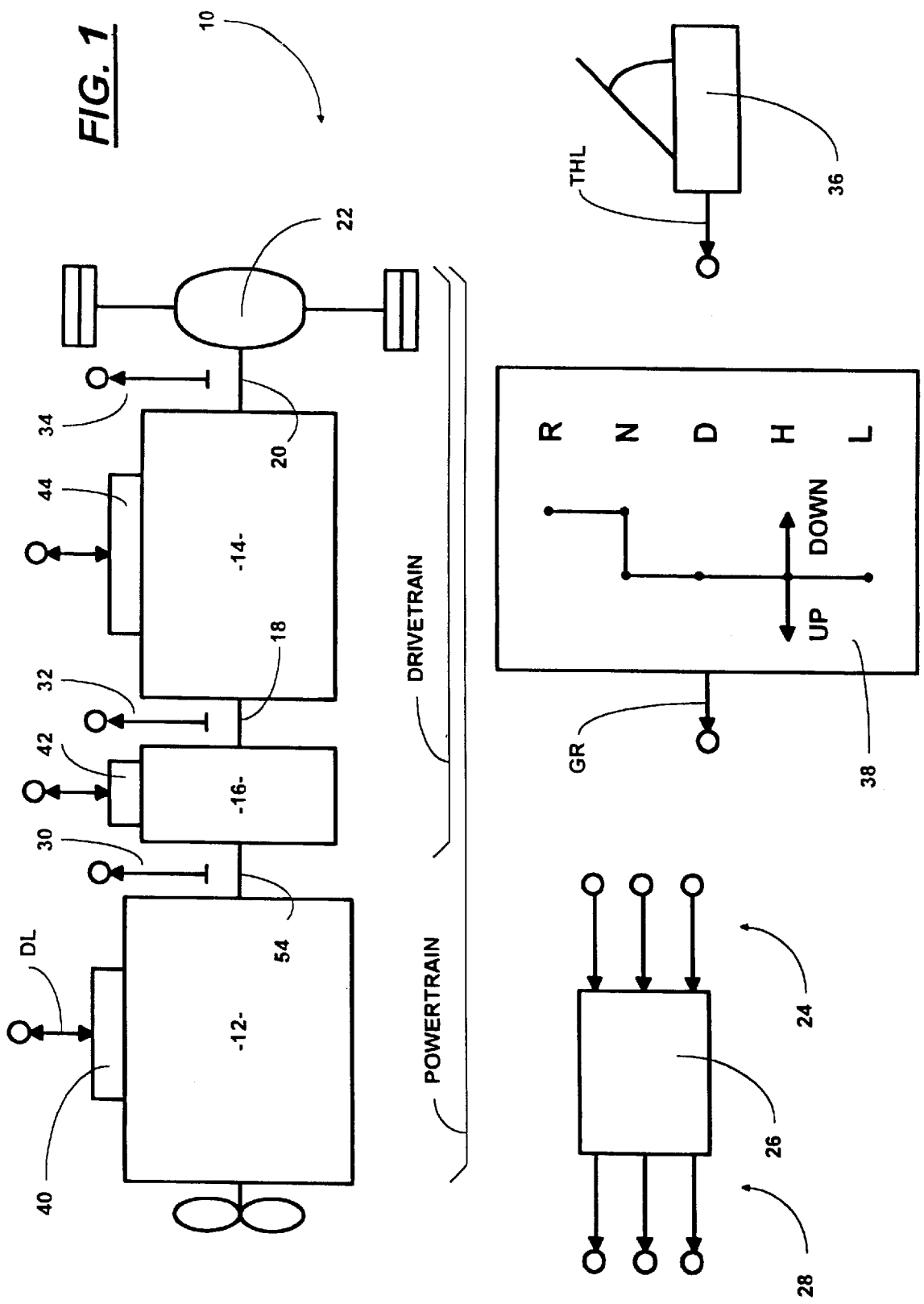

ENGINE OUTPUT TORQUE CONTROL FOR POWERTRAIN WITH ENGAGEABLE POSITIVE CLUTCHES

RELATED APPLICATIONS

This application is a continuation of U.S. Ser. No. 09/330,570, filed Jun. 11, 1999 now U.S. Pat. No. 6,080,082 and titled ENGINE OUTPUT TORQUE CONTROL FOR POWERTRAIN WITH ENGAGEABLE POSITIVE CLUTCHES, assigned to EATON CORPORATION, assignee of this application.

This application is related to U.S. Ser. No. 09/314,515, filed May 17, 1999 and titled POWERTRAIN TORQUE CONTROL, assigned to EATON CORPORATION, assignee of this application.

BACKGROUND OF THE INVENTION

1. Field of the Invention

The present invention relates to a control for a vehicular powertrain comprising a fuel-controlled engine and a multiple-ratio drivetrain, including a multiple-speed mechanical transmission and a single- or multiple-speed drive axle assembly. In particular, the present invention relates to a powertrain control wherein the maximum output torque of the engine is limited as a function of the degree of engagement of monitored jaw clutches.

2. Description of the Prior Art

Vehicular drivetrains including multiple-speed mechanical transmissions, usually compound transmissions, or simple transmissions coupled with multiple-speed axles, having 7, 9, 10, 13, 16, 18 or more forward speed ratios, are well known in the prior art, especially for heavy-duty vehicles, as may be seen by reference to U.S. Pat. Nos. 5,370,013; 5,527,237 and 4,754,665, the disclosures of which are incorporated herein by reference. Both synchronized and non-synchronized jaw clutches are known in the prior art, as may be seen by reference to U.S. Pat. Nos. 5,546,823; 5,588,516 and 5,642,643, the disclosures of which are incorporated herein by reference.

Control systems and methods for calculating engine output torque (also called "flywheel torque") are known in the prior art, as may be seen by reference to U.S. Pat. No. 5,509,867, the disclosure of which is incorporated herein by reference.

Automated and manual transmission systems wherein engine output torque is controlled and/or limited as a function of engaged gear ratio and/or vehicle speed are known in the prior art, as may be seen by reference to U.S. Pat. Nos. 5,477,827; 5,797,110; 5,457,633; 4,889,014; 5,738,606; 5,679,096 and 5,876,302, the disclosures of which are incorporated herein by reference. As is known, modern vehicular powertrains usually include electronically controlled engines, which may be controlled as to engine speed and/or engine torque. By way of example, according to the SAE J-1939 data link protocol, commands may be issued to the engine for fueling of the engine in accordance with (a) driver's fuel demand, (b) a requested engine speed, (c) a requested engine torque and/or (d) a requested maximum engine torque and/or engine speed.

While the prior art systems are effective in protecting the vehicle driveline from undue wear and/or damage resulting from greater-than-desirable torque being applied for a particular engaged ratio and/or driveline configuration, the systems do not prevent possible undue wear and/or damage resulting from partial jaw clutch engagement.

SUMMARY OF THE INVENTION

In accordance with the present invention, an improved control system/method for a vehicular powertrain is provided, which will tend to maximize vehicle performance while protecting the drivetrain from possible damage and/or undue wear caused by allowing excessive torque to be applied thereto under certain vehicle operating conditions, including partial jaw clutch engagement. The foregoing is accomplished by limiting possible engine output torque to a maximum value (torque limit) as a function of drivetrain ratio and/or vehicle speed. The actual output torque of the engine will be some percentage (from 0% to 100%) of the torque limit determined by the sensed degree of clutch engagement. By way of example, if full clutch engagement is sensed, the percentage will equal 100%, while at sensed minimal engagement, the percentage may equal 20% or less.

Accordingly, it is an object of the present invention to provide a new and improved engine output torque control for a vehicular drivetrain system, including a mechanical transmission wherein engine output torque is controlled as a function of sensed degree of jaw clutch engagement.

This and other objects and advantages of the present invention will become apparent from a reading of the description of the preferred embodiment taken in connection with the attached drawings.

BRIEF DESCRIPTION OF THE DRAWINGS

FIG. 1 is a schematic illustration of a vehicular powertrain system including an automated mechanical transmission system.

DESCRIPTION OF THE PREFERRED EMBODIMENT

Figure 2A:
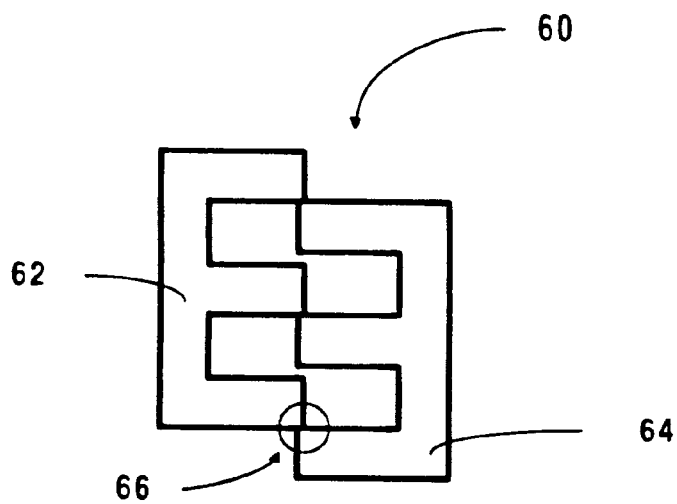
FIGS. 2A, 2B and 2C are schematic illustrations of, respectively, minimal, half and full degrees of jaw clutch engagement.

A vehicular powertrain system 10 of the type advantageously utilizing the control of the present invention may be seen by reference to FIG. 1. For purposes of illustration, system 10 is an automated mechanical transmission system including a fuel-controlled internal combustion engine 12 (such as a well-known diesel engine or the like), a multiple-speed mechanical transmission 14, and a non-positive coupling 16 for drivingly coupling the engine 12 to the transmission 14. Typically, non-positive coupling 16 will be a torque converter or a friction master clutch. The transmission 14 further includes an output shaft 20 for driving the vehicle drive axles 22. The drive axles may be of the single-speed or mulitple-speed type.

Transmission 14 may be of the known mechanical type utilizing positive jaw clutches to engage and disengage selected gears to shafts for changing the ratio of input shaft rotational speed (IS) to output shaft rotational speed (OS). Transmissions of this type may be seen by reference to U.S. Pat. Nos. 4,764,665; 5,385,056; 5,390,561 and 5,416,698.

System 10 may include a plurality of sensors for providing input signals 24 to a microprocessor-based control unit 26, which will process the input signals according to logic rules to generate command output signals 28 to various system actuators.

Speed sensors 30, 32 and 34 may be provided to provide input signals to the controller indicative of engine speed (ES), transmission input shaft speed (IS), and transmission output shaft speed (OS), respectively. A sensor 36 may be provided to provide an input signal indicative of the operator setting of the throttle pedal. A driver control console 38 is provided to allow the operator to select a transmission mode and to provide an input signal, GR, indicative thereof to the controller 26.

An engine controller 40, preferably microprocessor-based, may be provided for controlling fueling of the engine and for providing information to a data link, DL, indicative of the operating parameters of the engine. Preferably, the data link will comply with a known protocol, such as SAE J-1939 or the like. An actuator 42 may be provided for operating the non-positive coupling 16. A transmission actuator 44 may be provided for operating the transmission 14 and for providing signals indicative of the engaged gear ratio and/or other transmission operating parameters. Engaged ratio also may be calculated by comparing the rotational speeds of the input and output shafts.

Figure 2B:
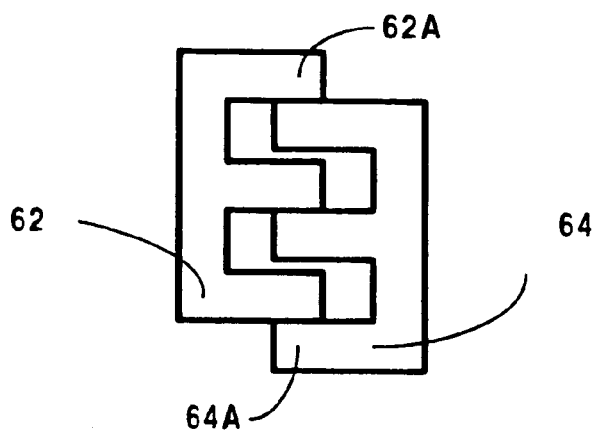
Figure 2C:
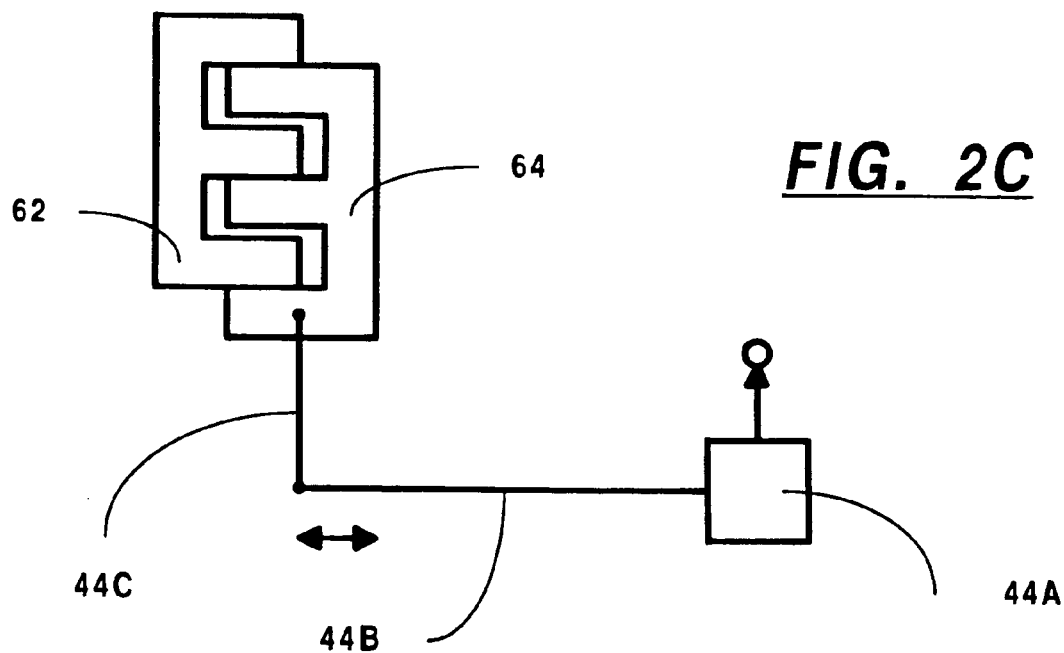

The actuator 44 will include position sensors 44A that will provide information as to axial position of the shift rail or shift shaft 44B and associated shift fork(s) 44C used to axially position the jaw clutches for engaging and disengaging selected ratios (see FIG. 2C). Various types of position sensors, such as (by way of example but not limitation) mechanical detents, Hall effect switches and the like, may be utilized within the scope of the present invention and an example of such mechanisms may be seen by reference to U.S. Pat. Nos. 5,729,110 and 5,743,143, the disclosures of which are incorporated herein by reference. Axial position sensing may include logic for detecting deflection-type errors, as seen in U.S. Pat. No. 5,566,070.

As used in this application, and as commonly used in the vehicular industry, the term "powertrain" will refer to the engine 12, coupling 16, transmission 14 and drive axles 12, while the term "drivetrain" will refer to the coupling 16, the transmission 14 and the axles 22.

Transmission 14 is illustrated as an 18-forward-speed transmission having a direct drive (1:1.00) ratio and two overdrive ratios (see FIG. 2B). As is well known, in the direct drive ratio, the shafts are directly coupled and torque is not applied to the gears; accordingly, a much higher torque may be applied to the transmission in direct drive without damaging or causing excessive wear to the gears. It also is known that the higher rotational speeds associated with overdrive (i.e., ratios wherein output shaft rotational speed exceeds input shaft rotational speed) allows a higher input torque to be applied to the transmission than in greater than 1:1.00 reduction ratios without risking damage and/or undue wear.

According to the present invention, possible engine torque ("torque limit") is limited according to the sensed or expected engaged driveline ratio. By way of example, in a heavy-duty truck having a typical diesel engine, in the start ratios, torque may be limited to no more than 1300 foot-pounds, in direct drive, torque may be limited to 1800 foot-pounds, and in overdrive, torque may be limited to no more than 1600 foot-pounds.

According to the present invention, the maximum output torque of the engine is also limited by the sensed degree of engagement of the jaw clutch(es).

As may be seen by reference to FIGS. 2A–2C, a jaw clutch 60 includes two jaw clutch members 62 and 64 carrying interengaging teeth 62A and 64A, which may be axially separated to disengage the clutch or moved axially together to engage the clutch. In the schematic illustration, clutch member 64 is moved axially relative to member 62 by a shift fork 44C associated with a shift rail 44B.

In FIG. 2A, the clutch 60 is only slightly engaged (see tip contact at 66). In this condition, full torque will cause torque lock, preventing full engagement and possibly damage to the tips of the clutch teeth.

In FIG. 2B, the degree of clutch engagement is about 50%, and about 50% to 80% of the torque limit may be transmitted without causing damage to the clutch teeth.

In FIG. 2C, the clutch 60 is fully engaged and there is no need to limit engine output torque as a function of degree of clutch engagement.

Figure 3:
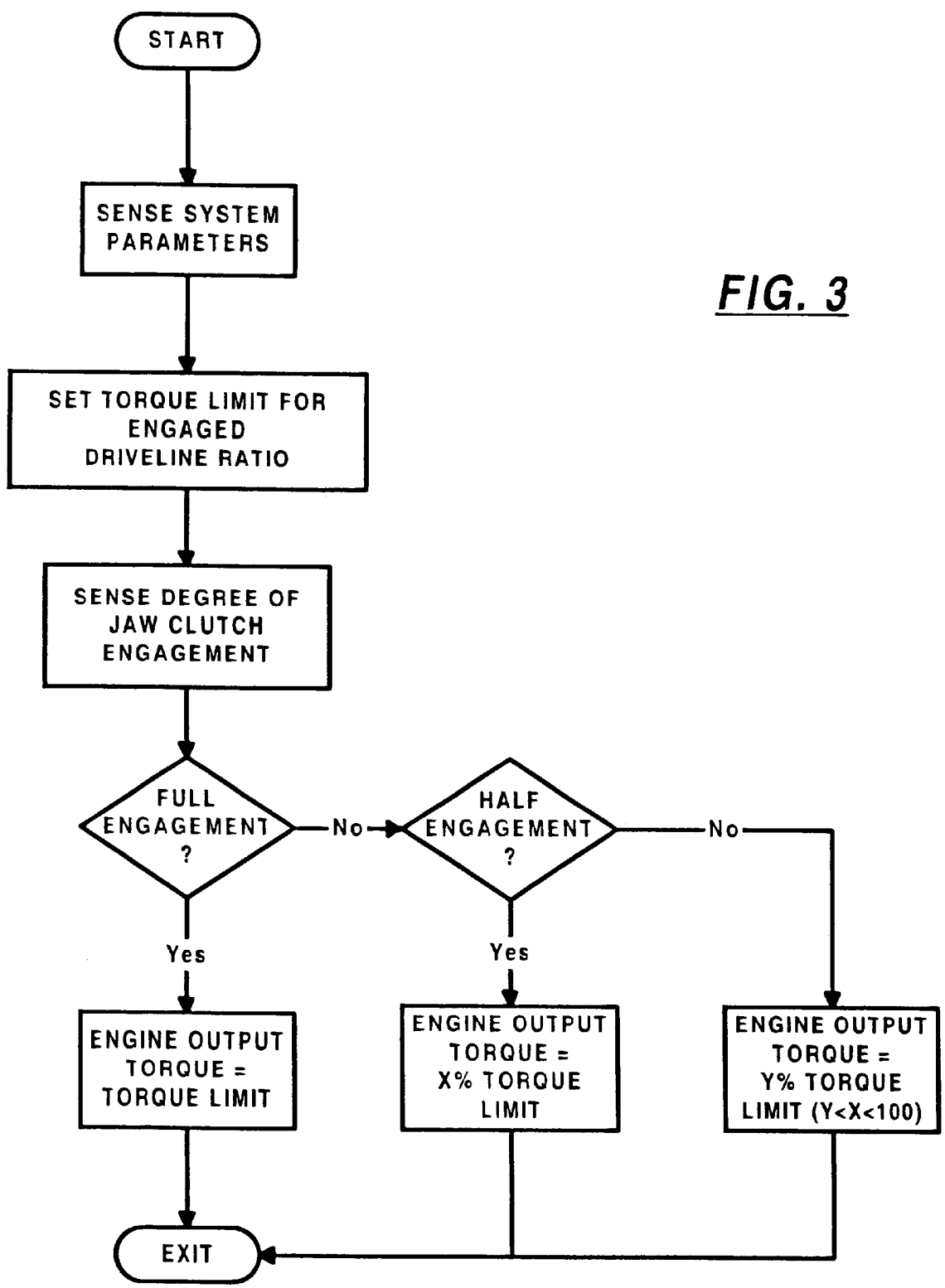
FIG. 3 is a flow chart representation of the control of the present invention.

The limiting of engine output torque as a function of sensed degree of clutch engagement may be a percentage of the torque limit, a preset value, or some combination thereof. FIG. 3 is a flow chart representation of the control of the present invention.

Figure 4:
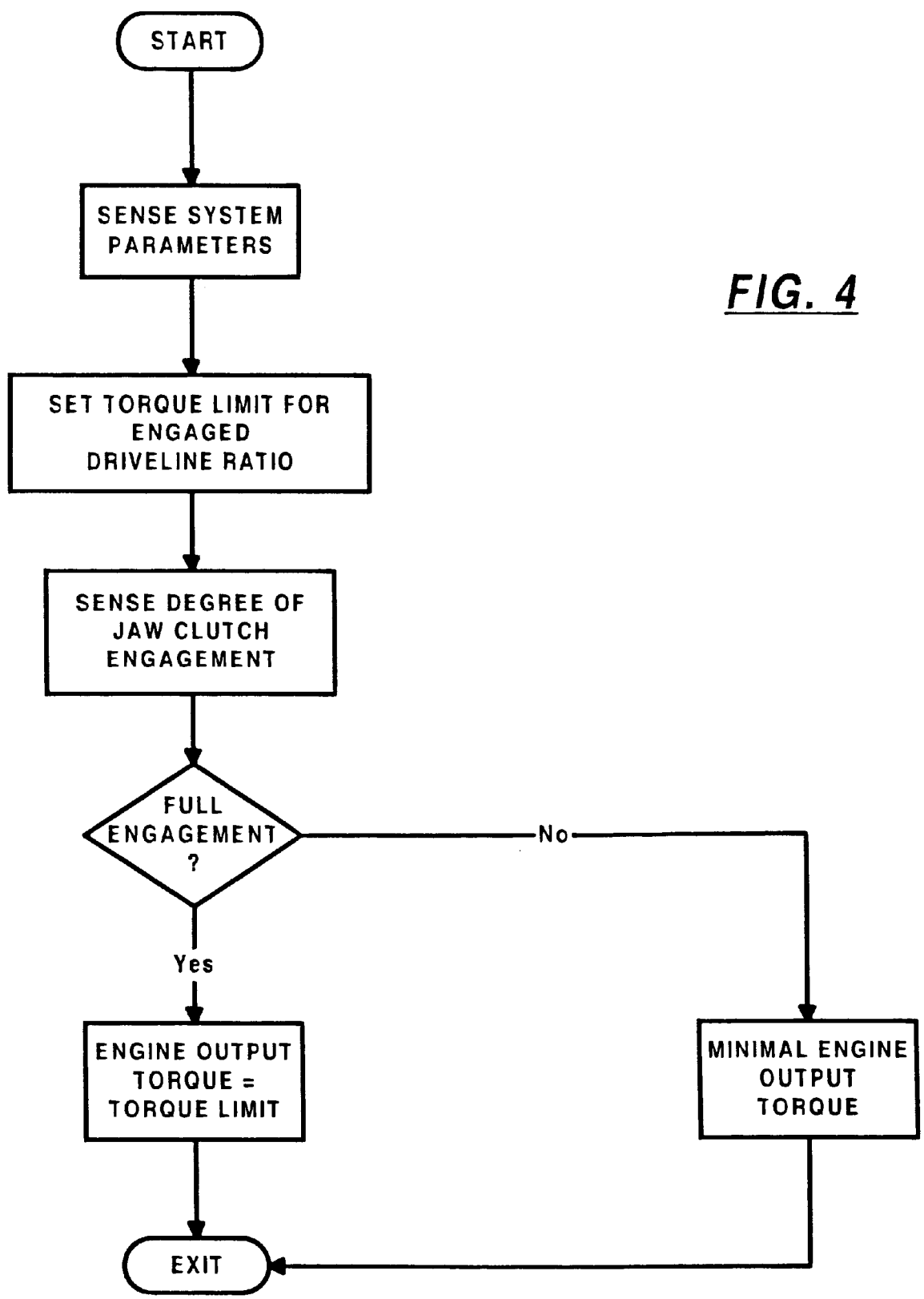
FIG. 4 is a flow chart representation of an alternate embodiment of the control of the present invention.

Alternatively (see FIG. 4), until substantially full engagement (FIG. 2C) is sensed, engine output torque may be minimalized to prevent tooth chipping and to minimize torque lock.

Although the present invention has been described with a certain degree of particularity, it is understood that various modifications are possible without departing from the spirit and scope of the invention as hereinafter claimed.

I claim:

1. A method for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable from a disengaged position to (a) a low degree of engagement position wherein said clutch teeth are in minimal engagement (FIG. 2A), and (b) a high degree of engagement position wherein said clutch teeth are at substantially maximum engagement (FIG. 2C), and a controller (26) communicating over an electronic data link (DL), for receiving input signals (24) and processing same according to logic rules to issue command output signals to system actuators including said engine controller, said method comprising the steps of:

(i) sensing engaged transmission ratio;
    (ii) determining a reference degree of jaw clutch engagement;
    (iii) sensing the degree of engagement of a jaw clutch associated with the engaged transmission ratio;
    (iv) comparing said sensed degree of jaw clutch engagement to said reference value; and
    (v) until said sensed degree of engagement exceeds said reference degree of engagement, continuously limiting output torque of said engine.

2. The method of claim 1 wherein said powertrain includes a sensor (44A) for providing a signal indicative of the axial position of an element (44B, 44C) axially movable with at least one of said clutch members (64).

3. The method of claim 1 wherein said output torque is limited as a function of engaged transmission ratio.

4. The method of claim 1 wherein engine output torque is limited to a minimal value unless said reference degree of clutch engagement is sensed.

5. The method of claim 3 wherein engine output torque is limited to a minimal value unless said reference degree of clutch engagement is sensed.

6. A system for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable from a disengaged position to (a) a low degree of engagement position wherein said clutch teeth are in minimal engagement (FIG. 2A), and (b) a high degree of engagement position wherein said clutch teeth are at substantially maximum engagement (FIG. 2C), and a controller (26) communicating over an electronic data link (DL), for receiving input signals (24) and processing same according to logic rules to issue command output signals to system actuators including said engine controller, said logic rules including rules for:

(i) sensing engaged transmission ratio;

(ii) determining a reference degree of jaw clutch engagement;

(iii) sensing the degree of engagement of a jaw clutch associated with the engaged transmission ratio;

(iv) comparing said sensed degree of jaw clutch engagement to said reference value; and (v) until said sensed degree of engagement exceeds said reference degree of engagement, continuously limiting output torque of said engine.

7. The system of claim 6 wherein said powertrain includes a sensor (44A) for providing a signal indicative of the axial position of an element (44B, 44C) axially movable with at least one of said clutch members (64).

8. The system of claim 6 wherein said logic rules include rules for limiting output torque as a function of engaged transmission ratio.

9. The system of claim 6 wherein engine output torque is limited to a minimal value unless said reference degree of clutch engagement is sensed.

10. The method of claim 8 wherein engine output torque is limited to a minimal value unless said reference degree of clutch engagement is sensed.

11. The method of claim 1 wherein said reference degree of engagement corresponds to said high degree of engagement wherein said clutch teeth are at a substantially maximum engagement (FIG. 2C).

12. The system of claim 6 wherein said reference degree of engagement corresponds to said high degree of engagement wherein said clutch is at a substantially maximum engagement (FIG. 2C).

13. A method for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable from a disengaged position to (a) a low degree of engagement position wherein said clutch teeth are in minimal engagement (FIG. 2A), and (b) a high degree of engagement position wherein said clutch teeth are at substantially maximum engagement (FIG. 2C), and a controller (26) for receiving input signals (24) and processing same according to logic rules to issue command output signals to system actuators including said engine controller, said method comprising:

(i) sensing engaged transmission ratio;

(ii) sensing the degree of engagement of a jaw clutch associated with the engaged transmission ratio and determining whether the degree of engagement of the jaw clutch is less than substantially maximum engagement of the jaw clutch;

(iii) upon determining that the degree of engagement of the jaw clutch is less than substantially maximum engagement of the jaw clutch, directly limiting output torque of said engine.

14. The method of claim 13, wherein engine output torque is limited as a function of the degree of engagement of the jaw clutch.

15. A method for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable from a disengaged position to (a) a low degree of engagement position wherein said clutch teeth are in minimal engagement (FIG. 2A), and (b) a high degree of engagement position wherein said clutch teeth are at substantially maximum engagement (FIG. 2C), and a controller (26) for receiving input signals (24) and processing same according to logic rules to issue command output signals to system actuators including said engine controller, said method comprising:

(i) sensing engaged transmission ratio;

(ii) sensing the degree of engagement of a jaw clutch associated with the engaged transmission ratio and determining whether the degree of engagement of the jaw clutch is less than substantially maximum engagement of the jaw clutch;

(iii) limiting the output torque of the engine during the entire period during which the degree of engagement of the jaw clutch is less than substantially maximum engagement of the jaw clutch.

16. The method of claim 15, wherein engine output torque is limited as a function of the degree of engagement of the jaw clutch.

17. The method of claim 15, wherein output torque is limited to a percentage of an engine maximum torque limit.

18. The method of claim 15, wherein output torque is limited to a preset value, which is less than the maximum allowable engine output torque.

19. A system for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable from a disengaged position to (a) a low degree of engagement (FIG. 2A), and (b) a high degree of engagement position wherein said clutch teeth are at substantially maximum engagement (FIG. 2C), and a controller (26) for receiving input signals (24) and processing same according to logic rules to issue command output signals to system actuators including said engine controller, said logic rules including rules for:

(i) sensing engaged transmission ratio;

(ii) sensing less than substantially maximum engagement of a jaw clutch associated with the engaged transmission ratio; and (iii) upon sensing less than substantially maximum engagement of the jaw clutch, directly limiting output torque of said engine.

20. A system for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable from a disengaged position to (a) a low degree of engagement (FIG. 2A), and (b) a high degree of engagement position wherein said clutch teeth are at substantially maximum engagement (FIG. 2C), and a controller (26) for receiving input signals (24) and processing same according to logic rules to issue command output signals to system actuators including said engine controller, said logic rules including rules for:

(i) sensing engaged transmission ratio;

(ii) sensing less than substantially maximum engagement of a jaw clutch associated with the engaged transmission ratio; and (iii) limiting output torque of said engine during the entire period of sensed less than substantially maximum engagement of the jaw clutch.

21. The system of claim 20 wherein output torque is limited to a percentage of a maximum torque limit.

22. The system of claim 20 wherein output torque is limited to a preset value, which is less than a maximum engine output torque.

23. The system of claim 20, further comprising a position sensor for providing information as to axial position of said jaw clutch.

24. The method of claim 1, further comprising sensing full engagement of said jaw clutch, and removing limits to engine output torque upon sensing full engagement.

25. The method of claim 15, further comprising sensing full engagement of said jaw clutch, and removing limits to engine output torque upon sensing full engagement of said jaw clutch.

26. The system of claim 6, wherein said logic rules includes rules for sensing full engagement of said jaw clutch, and removing limits to engine output torque upon sensing full engagement of said clutch.

27. The system of claim 19, wherein said logic rules includes rules for sensing full engagement of said jaw clutch, and removing limits to engine output torque upon sensing full engagement of said jaw clutch.

28. The method of claim 1 wherein step (v) comprises limiting engine output torque to a value less than 100% of maximum engine output torque and greater than zero engine output torque.

29. The method of claim 13 wherein step (iii) comprises limiting engine output torque to a value less than 100% of maximum engine output torque and greater than zero engine output torque.

30. The method of claim 15 wherein step (iii) comprises limiting engine output torque to a value less than 100% of maximum engine output torque and greater than zero engine output torque.

31. The system of claim 6 wherein said logic rule (iii) comprises limiting engine output torque to a value less than 100% of maximum engine output torque and greater than zero engine output torque.

32. The system of claim 19 wherein said logic rule (iii) comprises limiting engine output torque to a value less than 100% of maximum engine output torque and greater than zero engine output torque.

33. The system of claim 20 wherein said logic rule (iii) comprises limiting engine output torque to a value less than 100% of maximum engine output torque and greater than zero engine output torque.

* * * * *